United States Patent

Sekido et al.

[11] 3,976,502
[45] Aug. 24, 1976

[54] NICKEL-ZINC ALKALINE STORAGE BATTERY

[75] Inventors: Satoshi Sekido, Kyoto; Tsukasa Ohhira, Kadoma; Yutaka Ikeda, Neyagawa; Takao Yokoyama, Katana, all of Japan

[73] Assignee: Matsushita Electric Industrial Co., Ltd., Japan

[22] Filed: Dec. 17, 1974

[21] Appl. No.: 533,684

[52] U.S. Cl. .................. 136/6 GC; 136/28; 136/30; 136/146; 136/179
[51] Int. Cl.² .......................... H01M 10/00
[58] Field of Search ............ 136/28, 30, 179, 146, 136/147, 6 GC

[56] References Cited
UNITED STATES PATENTS

| | | | |
|---|---|---|---|
| 2,857,447 | 10/1958 | Lindstrom | 136/28 X |
| 2,951,106 | 8/1960 | Reutschi | 136/28 X |
| 3,080,440 | 3/1963 | Ruetschi et al. | 136/28 X |
| 3,207,630 | 9/1965 | Solomon et al. | 136/28 X |
| 3,356,533 | 12/1967 | Carson, Jr. | 136/28 X |
| 3,516,862 | 6/1970 | Vander Grinten | 136/30 |
| 3,558,358 | 1/1971 | Ropp, Jr. | 136/28 X |
| 3,669,746 | 6/1972 | Devitt et al. | 136/30 |
| 3,785,868 | 1/1974 | Devitt | 136/30 |
| 3,787,240 | 1/1974 | Gillman et al. | 136/30 |

*Primary Examiner*—John H. Mack
*Assistant Examiner*—C. F. Lefevour
*Attorney, Agent, or Firm*—Wenderoth, Lind & Ponack

[57] ABSTRACT

An alkaline storage battery which comprises a nickel positive electrode, a zinc negative electrode, a separator which wraps the negative an electrode and comprises from inside to outside in sequence: non-woven cellulose disposed on the negative electrode, a semi-permeable membrane of cellulose and micro-porous plastic film which is in contact with the positive electrode, an electrolyte consisting of aqueous solution of KOH which is held on the positive and negative electrodes and in the separator and is controlled in an amount such that free electrolyte does not exist in places other than at the three elements mentioned above, and a gas phase reaction catalyst which is provided in a space in the storage battery to promote the reaction between oxide and hydrogen evolved at the end of charging.

3 Claims, 8 Drawing Figures

NICKEL-ZINC ALKALINE STORAGE BATTERY

BACKGROUND OF THE INVENTION

1. Field of the Invention

The present invention relates to a nickel-zinc alkaline storage battery in which nickel oxide is used as the active material of the positive electrode, and zinc as the active material of the negative electrode and more particularly, it provides a battery of long life and low price which produces only small amount of dendritic crystals of zinc, by controlling the amount of alkaline electrolyte and improving the separating member.

2. Description of the Prior Art

Zinc has low atomic weight relative to those of other metals used as the active materials of the negative electrode of storage batteries, is electrochemically base, shows high hydrogen overvoltage, is low polluting and is still low priced; accordingly, it is suitable as an electrode material giving high energy density, high output, low self-discharge, low polution and low price. It is defective, however, in that because the discharge product dissolves in the electrolyte, the repetitive charge-discharge often causes disfiguration of the electrode, and short-circuiting due to the development of the dentritic crystals during charging, and consequently, such electrode made of zinc is shortlived.

Many studies have been carried out in order to eliminate these disadvantages while preserving the advantages. First of all for the prevention of the development of the dendritic crystals, the employment of additives in the electrode and/or electrolyte, stirring or circulating the electrolyte, charging by use of inverse current pulse or meta-stable voltage, use of electrolytes other than KOH such as amine baths, etc., have been proposed, and for the prevention of the disfiguration of the electrode, stirring or circulating the electrolyte, placing the electrode horizontally, making the discharge product insoluble, etc., have been offered.

It is believed, as described later, that the growth of the dendritic crystals results from the fact that the zincate ion in the solution deposits on the projected part if its supply to the electrode surface is not adequate, and since the additive does not serve to remove the direct cause, the complete prevention of the development of the dendritic crystals cannot be expected from its use. The method of stirring or circulating the electrolyte or the method of placing the electrode horizontally is disadvantageous in that the use of equipment which is complex, or is not portable in usual manner, is required. In the charging method, the use of chargers which are complex and high priced is unavoidable. The method of using as the electrolyte, an amine bath or the method of making the discharge product insoluble degrades the discharge characteristics.

As described hereabove, it was very difficult to lengthen the charge-discharge cycle life of the zinc negative electrode in alkaline solution.

According to this invention, the improvement in the charge-discharge cycle life is achieved by controlling the amount of the electrolyte, so that the free electrolyte may be eliminated, and by improving the separating member. In the case of nickel-zinc alkaline storage batteries, the batteries were short-lived due to the degradation of the zinc negative electrode, while the characteristics of the nickel positive electrode were excellent. Accordingly, the life of the nickel-zinc alkaline storage batteries would necessarily be lengthened by improving the life of the zinc negative electrode.

SUMMARY OF THE INVENTION

OBJECTS OF THE INVENTION

The object of this invention is to provide a nickel-zinc alkaline storage battery which is portable and low priced and has a long life, characterized in that the amount of liquid is controlled by holding the electrolyte within the battery in the positive and negative electrode and separating member, thereby eliminating the free electrolyte outside these elements, in an alkaline storage battery in which nickel oxide is used as its positive electrode, and zinc as its negative electrode, so that the zincate ion which dissolves out (precipitates) at the time of discharge may be retained in the neighborhood of the negative electrode, and the internal short-circuiting disruptive of the separator caused by the development of the dendritic crystals of zinc during charging is prevented.

BRIEF DESCRIPTION OF THE DRAWINGS

Other and further objects, features and advantages of the invention will appear more fully from the following description taken with the accompanying drawings, in which.

DETAILED DESCRIPTION OF THE INVENTION

Figure 1:
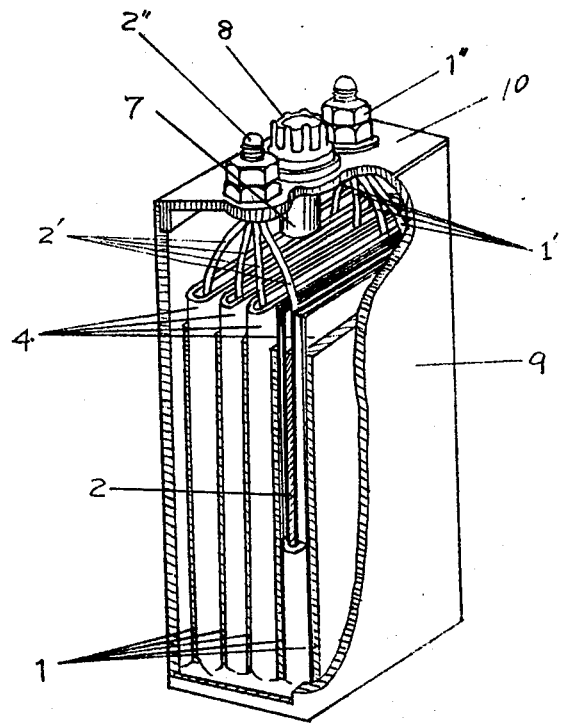
FIG. 1 is a constructional diagram of a battery of this invention.
Figure 2:
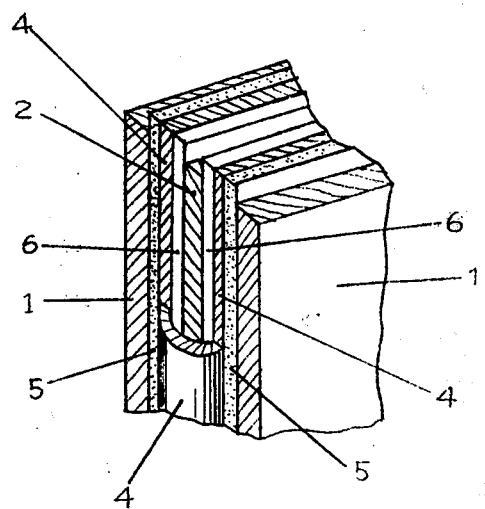
FIG. 2 is a detailed diagram of the separator part of the battery of this invention.
Figure 3:
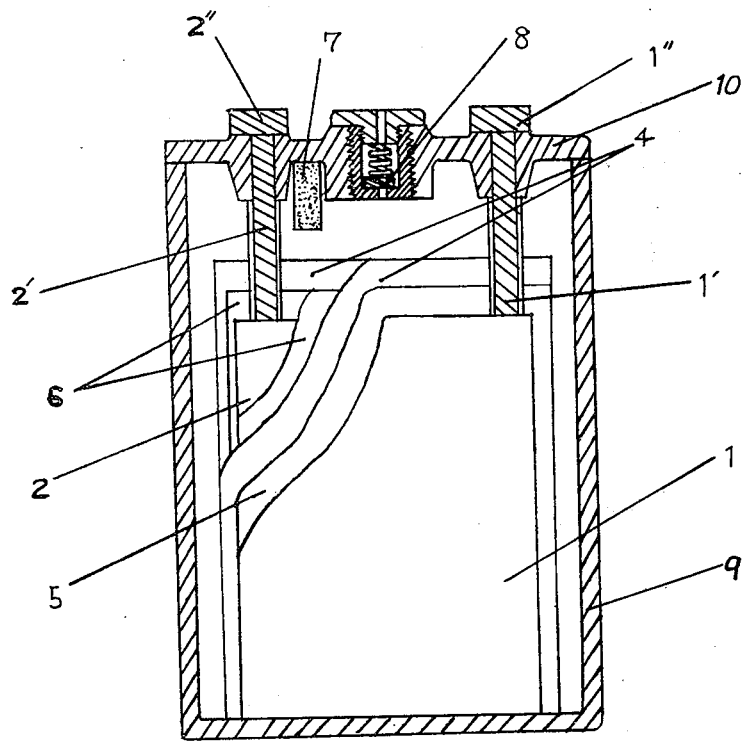
FIG. 3 is a composition diagram of a battery of this invention.

The composition of the storage battery of this invention is illustrated in FIGS. 1–3.

Referring to FIGS. 1–3, the battery is set up in the cell casing 9, 1 denoting 5 sintered nickel positive electrode. 1', the lead of the positive electrode; and 1'', the positive electrode terminal. 2 stands for the negative electrode formed of four pasty zinc negative electrodes which are formed by coating copper nets with zinc oxide powder kneaded with an aqueous solution of polyvinyl alcohol. 2' designates the lead of the negative electrode; and 2'', the negative electrode terminal. The composition of the separator of this battery is described in detail hereunder in reference to FIG. 2: A nonwoven cloth of cellulose is disposed adjacent to the negative electrode 2, to hold the electrolyte in the neighborhood of the negative electrode. Disposed successively apart therefrom are the semipermeable membrane 4 of cellulose, and then, a plastic film e.g., microporous polyethylene film or polypropylene film. The semipermeable membrane 4 of cellulose, permits passage of $H^+$ or $OH^-$ ion but is obstructive to such a huge ion as zincate ion ($Zn(OH)_4^{2-}$), and has the effect of keeping the discharge product in the neighborhood of the negative electrode 2. Because of its low resistance to oxidation, however, it suffers rapid degradation as it comes in contact with the positive electrode. In order to counter this disadvantage as well as catching the small amount of zincate ion which leaks toward the positive electrode through the semipermeable membrane 4 of cellulose, a micro-porous polyethylene film or polypropylene film 5 which serves also as the catcher of zincate ion is disposed between the positive electrode and the semipermeable membrane 4 of cellulose. In this plastic film, 5–15 wt% of fine powder of Ca(OH)$_2$ is dispersed. The capacity of the battery of this composition is nominally 4.0 Ah.

As the electrolyte of this battery, 20 ml of an aqueous solution of 7 mol/1 KOH is filled in, thereby, eliminating free electrolyte. The gas phase reaction catalyst 7 is prepared by mixing artificial graphite and fluorine resin powders at a weight ratio of 4:1 adding thereto 1 wt% of platinum, and then after forming the mixture, sintering it at 350°C. It is then, securely set on the inside of the cover 10 of the cell so as to position it in the gas phase. 8 indicates the safety valve. In the battery of this construction, the zinc negative electrode disfigures only a little because of the absence of free electrolyte. This may be interpreted by the discharge reaction of zinc negative electrode generally represented by the following formula:

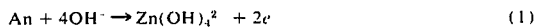

$$Zn + 4OH^- \rightarrow Zn(OH)_4^{2-} + 2e \qquad (1)$$

Thus, the amount of free electrolyte in excess of what is required causes increased dissolving-out of zinc during charging and consequent notable disfigure. It is for this reason that the non-woven cloth 6 of cellulose is utilized for the purpose of retaining the necessary amount of OH$^-$ in the neighborhood of the negative electrode.

On the other hand, the plastic film containing Ca(OH)$_2$ is capable of combining with zincate ion according to the undermentioned reaction formula:

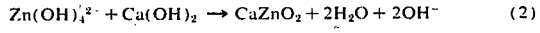

$$Zn(OH)_4^{2-} + Ca(OH)_2 \rightarrow CaZnO_2 + 2H_2O + 2OH^- \qquad (2)$$

Thus, zincate ion is combined in the form of calcium zincate, and OH$^-$ ion is liberated. As is evident from the reaction formula (2), the larger the amount of Ca(OH)$_2$, the better. If more than 16wt.% is mixed in, however, the resistance of the plastic film is high, giving rise to poor battery characteristics. Conversely, if Ca(OH)$_2$ is less than 4 wt%, a satisfactory effect will not be achieved, because of the small zincate ion combining ability.

The reason why the liquid impregnator, semipermeable membrane of cellulose and micro-porous plastic film are successively disposed from inside out facing the negative electrode in composing the separator is that, as is obvious from the reaction of (1), the zinc negative electrode needs a large amount of OH$^-$ ion at the discharge time. Even in a construction where the amount of liquid is restricted, the non-woven cloth of cellulose is disposed in the neighborhood of the negative electrode, to hold OH$^-$ ion and so the electrolyte. Moreover, the semipermeable membrane of cellulose has the effect of retaining Zn(OH)$_4^{2-}$ formed by the discharge in the neighborhood of the negative electrode. This semipermeable membrane has the desirable property of permitting such a small ion as OH$^-$ ion to pass through, but not such huge ion as Zn(OH)$_4^{2-}$ ion, but its resistance to oxidation is poor. For this reason, the plastic film is superposed ahead of it, to prevent it from direct contact with the positive electrode 1.

With such construction, the restriction on the amount of liquid does not affect the characteristics of the battery. Especially, the use as the separator of the non-woven cloth of cellulose and the semipermeable membrane in 2 partitions is effective to decrease the chance of short-circuiting resulting from the crystal growth of zinc.

Furthermore, it is also effective to reinforce the bent part with cellophane tape, etc. Essential elements other than the use of the separator include the means for retaining the zincate ion dissolved out at the discharge time in the neighborhood of the cathode by depleting the free electrolyte in the interior of the battery and the means for preventing the internal short-circuiting by inhibiting the growth of the dendrite of zinc which may otherwise go on from the point at which diffusion of zincate ion begins to decrease, i.e. at the terminal period of charging. The battery may be placed in any position because the lack of free electrolyte prevents the loss of zincate ion from the neighborhood of the negative electrode. Generally, in open batteries, the liquid exhausts as the electrolyte is reduced, but this does not occur in the battery of this invention, being of a closed construction and adapted for restoration of the generated gases into H$_2$O with the gas phase reaction catalyst 7 is disposed in the gas phase space. The restriction or reduction of the amount of the electrolyte does not affect the performance of the battery. The reason is because sufficient amount of the electrolyte is held between the positive electrode and negative electrode to ensure the proper functioning of the reacting surfaces.

While the battery described hereabove is of a closed construction, it is also possible to have longer life, if desired, by further installing an auxiliary electrode.

Figure 4:
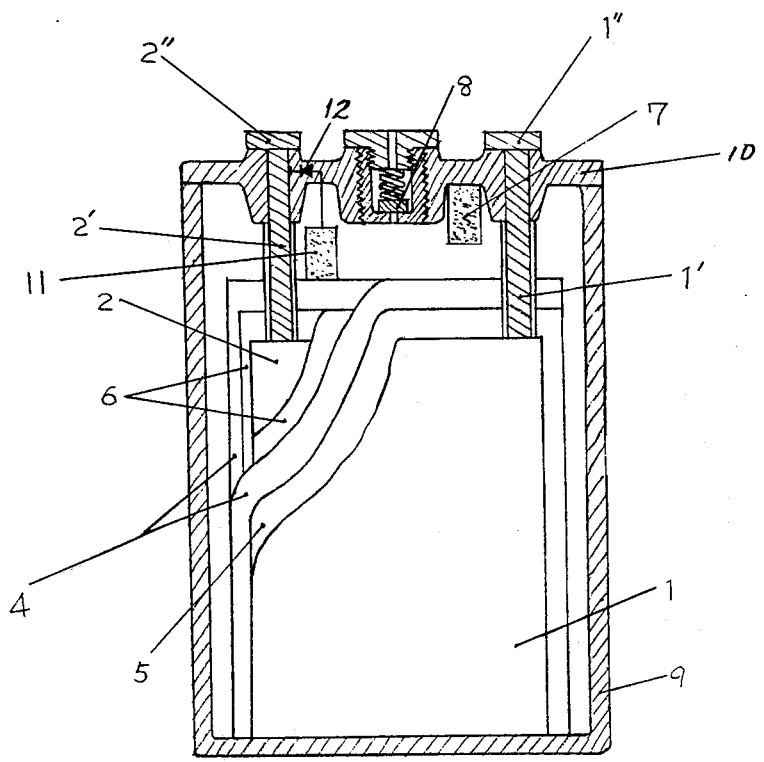
FIG. 4 is a constructional installation diagram of the auxiliary electrode of the battery of this invention.

FIG. 4 represents the construction of a battery fitted with this auxiliary electrode. The inside of the cell casing 9 is composed similarly as shown in FIGS. 1–3. The auxiliary electrode 11 is associated with the negative electrode terminal 2 through a non-linear element 12, so that the oxygen generated from the positive electrode at the terminal period of charging may be absorbed, to cut down the charging current of the negative electrode 2, thereby inhibiting the development of the dendrite. For avoidance of the generation of hydrogen from the auxiliary electrode, due to the deposition potential of zinc being electrochemically lower than the potential of hydrogen generation, an element having a flat voltage of 700 mV is used as this non-linear element 12. In manufacturing this auxiliary electrode the artificial graphite powder mixed with 1 wt% Pt or artificial graphite powder mixed with fluorine resin powder to which 1 wt% Pt is added or Ag powder and fluorine resin powder mixed at a ration of 4:1 is formed, and then heat-treated at 250°–300°C, with Ag thereafter amalgamated.

Figure 5:
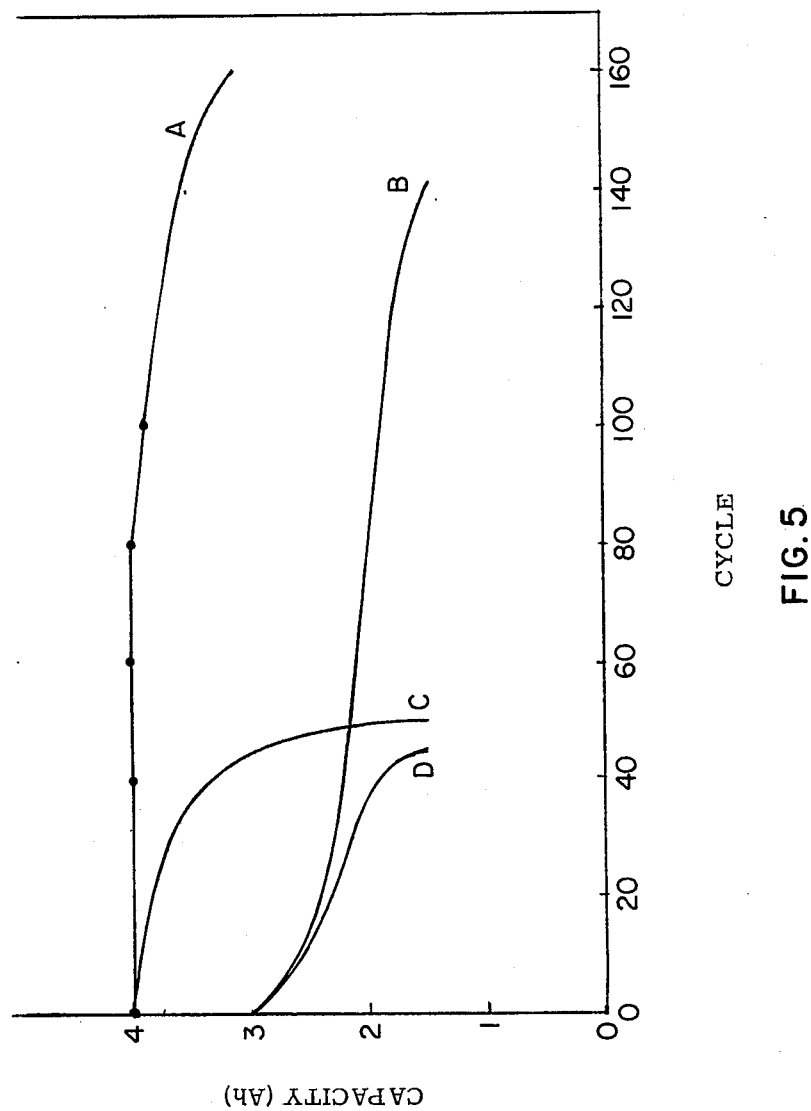
FIG. 5 is a cycle-capacity graph with separator composition as parameter.

FIG. 5 indicates the effect of the separator composition of this invention, namely, the effect on the battery lifetime when the composition of the separator of the nickel-zinc alkaline storage battery of 4 Ah nominal capacity is varied. In 1 cycle of the test, a continuous discharge through a constant resistance of 1 Ω, and the charging is run at 450 mA for 10 hours. The change in the discharge capacity when this charge-discharge cycle test is repeated is measured. Referring to this graph, A represents the data for the battery with the separator of this invention being of the three-layer construction; B, that not provided with the electrolyte holder of non-woven cloth of cellulose on the negative electrode side; C, that not provided with the micro-porous polyethylene film on the positive electrode side; and D, that with the semipermeable membrane of cellulose.

For the separator of the batteries of this type, heretofore semipermeable membrane of cellulose only is used, or nylon cloth is used on the positive electrode side. Therefore the comparison is made for C and D with the data for the conventional batteries. Because the gas phase reaction catalyst is disposed inside the battery, the hydrogen and oxygen generated at the terminal period of charging are reunited and restored as water, thereby almost forestalling liquid exhaustion. The test results show that if the non-woven cloth of cellulose is not used, the discharge characteristics are low, and that if the microporous polyethylene film is not used, the separator of the semipermeable membrane of cellulose degrades early, giving rise to shortened life. This is because the semipermeable membrane, if brought in direct contact with the positive electrode, may break down, becoming notably poor in the resistance to oxidation.

Figure 6:
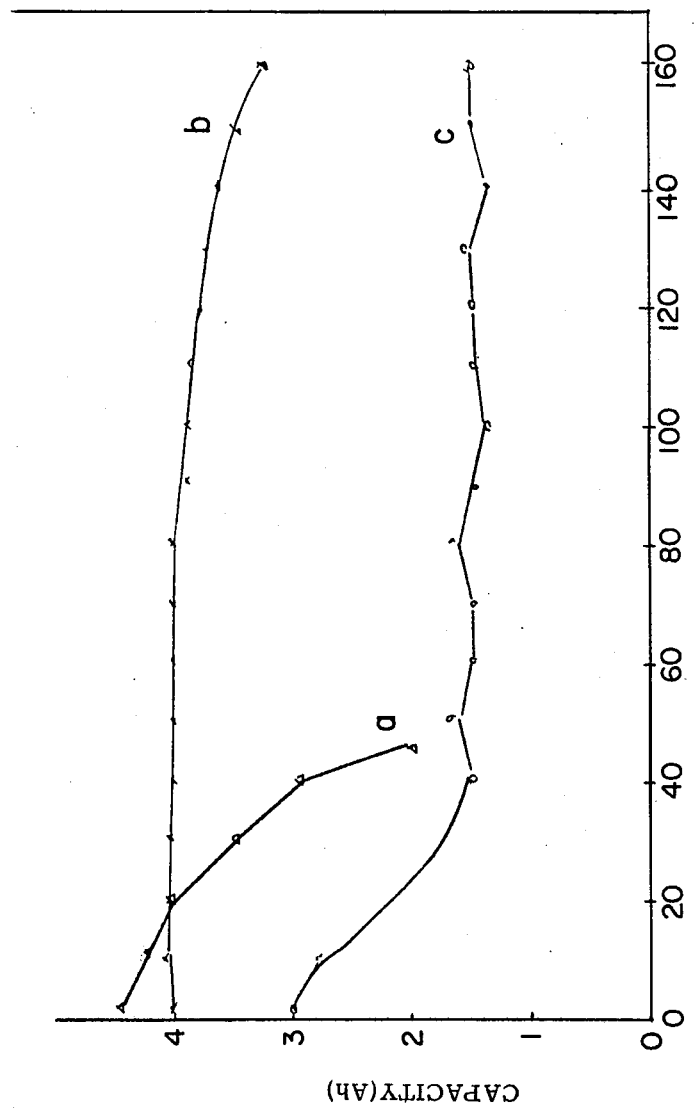
FIG. 6 is a graph showing the effect of the control of the amount of liquid on cycle.

FIG. 6 indicates the effect on battery life by controlling the amount of the electrolyte in the separator of this invention shown in FIG. 1–3. (a) denotes the data for the battery in which sufficient amount of 7 mol/l aqueous solution of KOH is filled in the electrode inside the cell submerged and to the rate of more than 2.2 ml per Ah of the active material of the negative electrode. (b) designates the data for the battery with 20 ml of liquid per 1 Ah of the active material of the negative electrode, which is a moderate amount, not too large nor too small. (c) gives the data for the battery with 1.6 ml of the liquid filled per 1 Ah of the active material of negative electrode. The charge-discharge test was conducted under the same condition as that of FIG. 5.

The results of the experiment show that as the amount of liquid is reduced below 1.6 ml, the discharge capacity diminishes, but the life is lengthened. The reason is because the amount of zinc dissolved out is small, so that not only its disfigurement is curbed, but the short-circuiting due to the growth of dendrite during charging is prevented as well. However, such batteries, having small capacities, are not practically useful. When the amount of the electrolyte is large, the capacity is large in the initial cycle, but the disfigurement of the negative electrode and the development of the dendrite under charge are notable, giving rise to the liability of short-circuiting. 2.0 ml of (b) was found most suitable, the adequate amount of electrolyte ranging, as found by various investigations, 1.7 ml–2.1 ml. In this range, an adequate discharge capacity was maintained, while the life was long. Regarding the concentration range of an electrolyte consisting of an aqueous solution of KOH, over 5 mol/l–7 mol/l where the electric conductivity is high, a nearly equal effect is obtained, but at concentrations lower than 4 mol/l, the absolute amount of $OH^-$ declines, and the electric conductivity of the electrolyte drops. Concentrations higher than 8 mol/l are not desirable because of the low electric conductivity and high viscosity at these concentrations.

Figure 7:
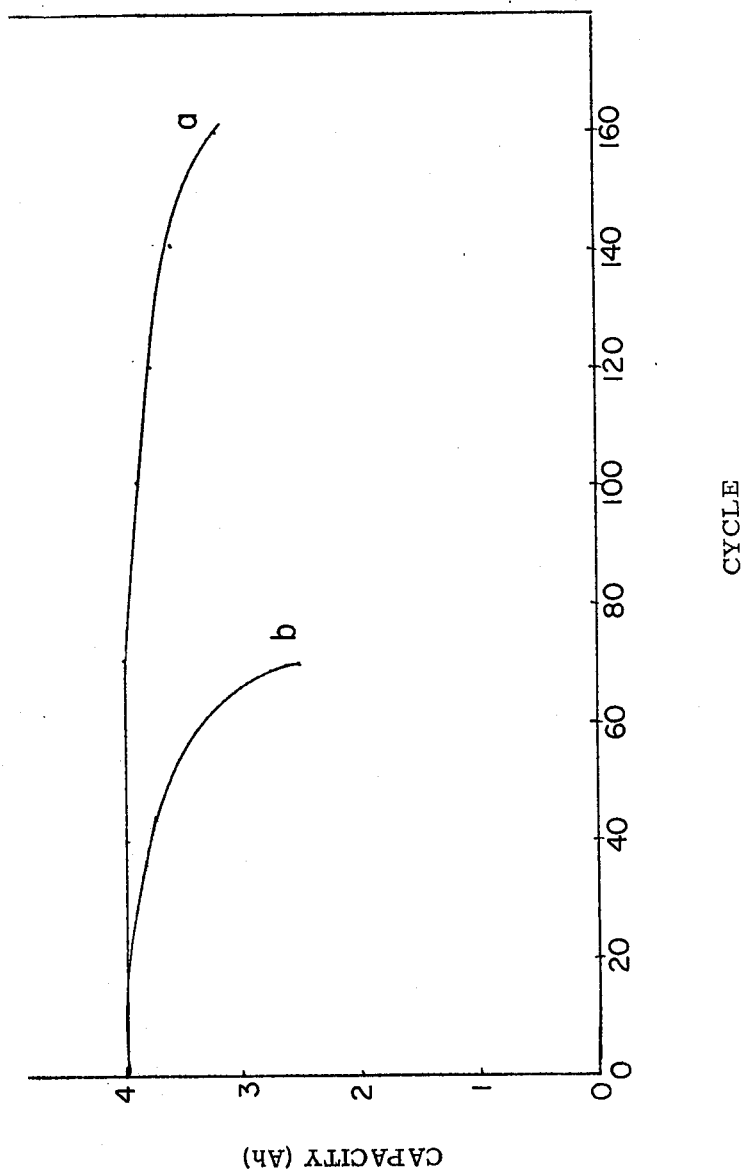
FIG. 7 shows effect of gas phase reaction catalyst.

In the following, the effect of using the gas phase reaction catalyst is described: A performance comparison was made between a battery of the composition shown in FIGS. 1–3 in which the amount of the electrolyte, consisting of 7 mol/l aqueous solution of KOH only, was kept at 2.0 ml per 1 Ah of the active material of the negative electrode, and the aforementioned gas phase reaction catalyst was employed, and another battery of a composition devoid of this catalyst. The result is shown in FIG. 7. The condition of the experiment was the same as that of FIG. 5. In this graph, $a$ denotes the data for the battery provided with the gas phase reaction catalyst; $b$ the characteristic of the battery deprived of the catalyst. $b$ signifies that notable liquid exhaustion occurs with advancing cycle; as a consequence, the internal resistance of the battery increases, and the reacting solution is depleted, resulting in marked decrease in capacity. The gas phase reaction catalyst can hardly achieve the complete prevention of the liquid exhaustion, but is remarkably effective in lengthening the life.

As another means for lengthening the life, jointly used are the gas phase reaction catalyst and an auxiliary electrode. The effect is described in detail hereunder.

The effect of the gas phase reaction catalyst in restoring water by absorbing oxygen and hydrogen at the terminal period of charge obviates liquid exhaustion even when the battery is overcharged. This reaction takes place, however, only when oxygen and hydrogen are generated at a ratio of 1:2. If either one of these gases is generated earlier than the other, that gas must be eliminated from the cell under the elevated internal pressure of the battery. Accordingly, it is hard to obtain a fully closed nickel-zinc alkaline storage battery by relying solely on the gas phase reaction catalyst. Especially on the nickel positive electrode, a small amount of oxygen is generated during the charging process due to the oxygen overvoltage, and is the essential cause for raising the internal pressure of the battery. On the other hand, on the zinc negative electrode, some growth of the dendrite, while generating a small amount of hydrogen, is possible at the terminal period of charge, however, strictly the amount of liquid is controlled. For the prevention of the development of crystals of zinc, the use of the semipermeable membrane of cellulose is necessary, as described previously. The negative electrode enveloped by this semipermeable membrane shows only a slight absorption the oxygen generated. This is attributable to the difficulty with which the semipermeable membrane allows oxygen gas to pass therethrough. Accordingly, if it is possible to deplete the oxygen gas by whatever means available, the closing of the system is practicable. For this purpose, the use of an auxiliary electrode is necessary.

The auxiliary electrode is composed as shown in FIG. 4. The effect of its use was examined.

Figure 8:
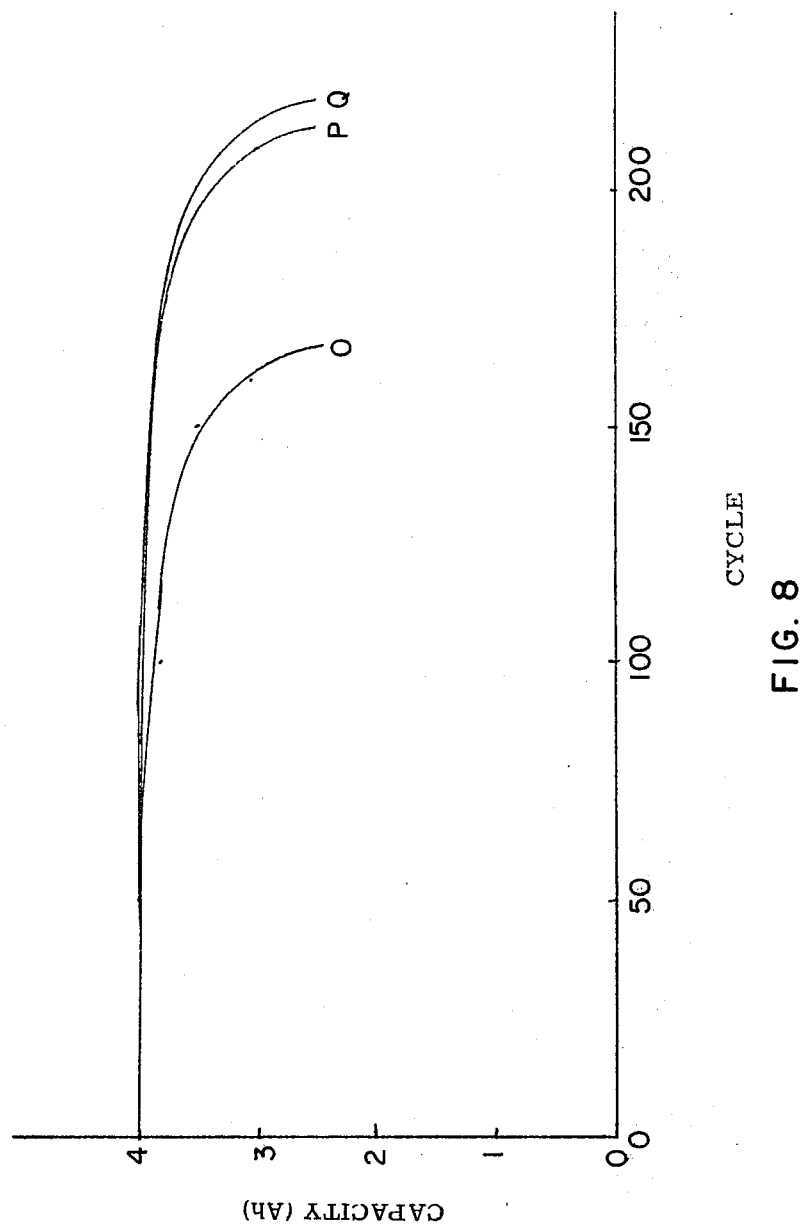
FIG. 8 shows effect of gas phase reaction catalyst and the installation of auxiliary electrode.

FIG. 8 shows the effect of the joint use of the gas phase reaction catalyst and the auxiliary electrode. Referring to this graph, O, corresponding to $b$ of FIG. 6, denotes the characteristic of a battery merely provided with the gas phase catalyst, and P, that of another battery equipped with the auxiliary electrode in addition to the gas phase catalyst. In installing this auxiliary electrode in a battery of the construction shown in FIG. 4, the auxiliary electrode is connected to the negative electrode through a non-linear element giving a flat characteristic at 700 mV. The auxiliary electrodes used include one of artificial graphite powder mixed with 1 wt% of Pt and the other of fluoride resin powder mixed with Pt at a weight ratio of 4:1 which was baked in nitrogen. Q represents the characteristics obtained with an electrode either of a porous Ag electrode plate amalgamated or of Ag powder and fluoride resin powder mixed at a weight ratio of 4:1 which was formed and then, baked, furthermore, with Ag amalgamated 30 percent. These results evidently show that the joint use of the auxiliary electrode is more effective than the mere use of the gas phase catalyst in reducing the liquid exhaustion, thereby lengthening the life.

The reason is because the auxiliary electrode absorbs the oxygen which is generated during the charging process, and shunts the charging current to the negative electrode through the non-linear element connected to the negative electrode, thereby reducing the current, with resultant effect of inhibiting the overcharging of zinc.

Especially at the terminal period of charge, the generation of oxygen is notable. Part of such oxygen is absorbed by the auxiliary electrode, and while inhibiting the generation of hydrogen from the cathode as much as possible, the excess oxygen and hydrogen are reacted on the gas phase reaction catalyst, thereby restoring water. Thus, the effect of double inhibition is achieved.

What we claim is:

1. A nickel-zinc alkaline storage battery comprising a zinc negative electrode; a nickel positive electrode in spaced relationship to said zinc negative electrode; a separating means provided in the space between said negative and positive electrodes, said separating means being composed of a first non-woven cellulose separator layer disposed on said negative electrode, a second separator layer disposed on said positive electrode and third separator layer of cellulose semipermeable membrane interposed between said first and second separator layers; an electrolyte consisting of an aqueous solution of KOH, which is held on said positive and negative electrodes, and in said separating means, and is controlled in an amount such that free electrolyte does not exist in other places than at said positive and negative electrodes and said separating means; and a container encapsulating said electrodes, separating means and electrolyte, and wherein said second separator layer is composed of a microporous plastic film having dispersed therein 5 to 15 weight percent of fine powder of $Ca(OH)_2$ so as to restrain the oxidation of semipermeable membrane and trap zincate ion, and wherein a gas phase reaction catalyst is provided within said storage battery to promote the reaction between oxygen and hydrogen evolved at the end of charging.

2. A nickel-zinc alkaline storage battery according to claim 1, wherein said electrolyte consists of an aqueous solution of 5–7 mol/l KOH and the amount thereof is 1.7 – 2.1 ml per 1 Ah of negative active material.

3. A nickel-zinc alkaline storage battery comprising a zinc negative electrode; a nickel positive electrode in spaced relationship to said zinc negative electrode; a separating means provided in the space between said negative and positive electrodes, said separating means being composed of a first non-woven cellulose separator layer disposed on said negative electrode, a second separator layer disposed on said positive electrode and third separator layer of cellulose semipermeable membrane interposed between said first and second separator layers; an electrolyte consisting of aqueous solution of KOH, which is held on said positive and negative electrodes, and in said separating means, and is controlled in an amount such that free electrolyte does not exist in other places than at said positive and negative electrode and said separating means; and a container encapsulating said electrodes, separating means and electrolyte, and wherein said second separator layer is composed of a microporous plastic film having dispersed therein 5 to 15 weight percent of fine powder of $Ca(OH)_2$ so as to restrain the oxidation of semipermeable membrane and trap zincate ion, and wherein an auxiliary electrode is provided within said storage battery and connected to said negative electrode through a non-linear element having an uniform characteristic of 700 mV.

* * * * *